(12) United States Patent
Chen

(10) Patent No.: US 8,692,144 B2
(45) Date of Patent: Apr. 8, 2014

(54) KEYBOARD

(75) Inventor: Bo-An Chen, Taipei (TW)

(73) Assignee: Primax Electronics Ltd., Taipei (TW)

( * ) Notice: Subject to any disclaimer, the term of this patent is extended or adjusted under 35 U.S.C. 154(b) by 462 days.

(21) Appl. No.: 12/955,713

(22) Filed: Nov. 29, 2010

(65) Prior Publication Data

US 2012/0090968 A1   Apr. 19, 2012

(30) Foreign Application Priority Data

Oct. 15, 2010   (TW) ................................ 99135184 A

(51) Int. Cl.
*H01H 9/00*   (2006.01)

(52) U.S. Cl.
USPC ......................................... 200/314; 200/512

(58) Field of Classification Search
USPC ................................................ 200/314, 512
See application file for complete search history.

(56) References Cited

U.S. PATENT DOCUMENTS

| 4,302,647 A * | 11/1981 | Kandler et al. ............... 200/512 |
| 7,388,167 B2 * | 6/2008 | Liao et al. ..................... 200/310 |
| 7,994,445 B2 * | 8/2011 | Aihara et al. ................. 200/314 |
| 2008/0135392 A1 * | 6/2008 | Huang et al. ................. 200/5 A |

\* cited by examiner

*Primary Examiner* — Renee S Luebke
*Assistant Examiner* — Lheiren Mae Caroc
(74) *Attorney, Agent, or Firm* — Kirton McConkie; Evan R. Witt

(57) ABSTRACT

A keyboard includes a membrane circuit board, a luminous key, a light-emitting element and a plastic film layer. The luminous key has a keycap with a light-transmissible part. The luminous key is configured for triggering a membrane switch of the membrane circuit board. The light-emitting element is disposed on the membrane circuit board and arranged under the light-transmissible part for emitting a light beam. The plastic film layer is disposed on the membrane circuit board, and includes a convex structure, which is integrally formed with the plastic film layer. The light-emitting element is enclosed by the convex structure. The convex structure has an opening aligned with the light-emitting element. The keyboard of the present invention has enhanced production yield and reduced light leakage.

6 Claims, 7 Drawing Sheets

KEYBOARD

FIELD OF THE INVENTION

The present invention relates to a keyboard, and more particularly to a keyboard with a luminous key.

BACKGROUND OF THE INVENTION

Recently, with increasing development of information industries, the general trends in designing information devices (e.g. computer keyboards) are toward small size, light weightiness and slimness. Generally, the keyboard has some specified function keys, for example the Caps lock key, the Number lock, and the like. In addition, plural indicating lamps corresponding to these specified function keys are arranged at other positions of the keyboard or at the hardware component around the keyboard. In a case that one of the specified function keys is pressed, a corresponding specific function is enabled, and thus a corresponding indicating lamp is turned on to result in an identification effect. Since these indicating lamps occupy layout space of the keyboard, the indicating lamps become hindrance from miniaturization of the keyboard. Moreover, too many indicating lamps may confuse the user. Under this circumstance, the user fails to accurately judge which function keys correlate to the illuminated indicating lamps.

For solving the above drawbacks, a keyboard as shown in FIGS. 1 and 2 is disclosed. FIG. 1 is a schematic cross-sectional view illustrating a conventional keyboard. FIG. 2 is a schematic enlarged fragmentary view illustrating the keyboard of FIG. 1. The keyboard 1 comprises a base 11, plural luminous keys 12, plural ordinary keys 13, plural light-emitting elements 14, a membrane circuit board 15 and a plastic film layer 16. The plastic film layer 16 is disposed on the membrane circuit board 15. Each of the luminous keys 12 comprises a keycap 121 and an elastic element 122. Each of the ordinary keys 13 comprises a keycap 131 and an elastic element 132. The keycap 121 of each luminous key 12 has a light-transmissible part 1211. The light-emitting elements 14 are disposed on the membrane circuit board 15 and arranged under the light-transmissible parts 1211 of corresponding luminous keys 12. The luminous keys 12 are specified function keys, which are triggered to enable specified functions. Each of the luminous key 12 further comprises a light shade 123 with an opening 1231. The light shade 123 is made of a rubbery material. In addition, the corresponding light-emitting element 14 is enclosed by the light shade 123. Consequently, the light beam emitted by the light-emitting element 14 is only permitted to be transmitted through the opening 1231 of the light shade 123 without being scattered to the periphery of the light shade 123.

Moreover, the membrane circuit board 15 comprises an upper circuit board 151, a lower circuit board 153 and a partition plate 152. The partition plate 152 is arranged between the upper circuit board 151 and the lower circuit board 153. Corresponding to the plural keycaps 121 and 131, plural upper contacts 1511 and plural lower contacts 1531 are respectively formed on the upper circuit board 151 and the lower circuit board 153. Corresponding to the plural upper contacts 1511 and the plural lower contacts 1531, plural perforations 1521 are formed in the partition plate 152. The upper contacts 1511, the lower contacts 1531 and the perforation 1521 that are aligned with each other collectively define a membrane switch 154. When one of the keycap 121 or 131 of the key 12 or 13 is pressed, the keycap 121 or 131 is moved downwardly to compress the elastic element 122 or 132, so that the elastic element 122 or 132 pushes against the corresponding upper contact 1511. Consequently, the upper contact 1511 is contacted with the corresponding lower contact 1531 through the corresponding perforation 1521. When the upper contact 1511 and the lower contact 1531 are contacted with each other, the corresponding membrane switch 154 is electrically conducted, and thus a corresponding key signal is outputted from the keyboard 1. On the other hand, when the pressing force exerted on the keycap 121 or 131 is eliminated, an elastic force provided by the elastic element 122 or 132 is acted on the keycap 121 or 131, so that the keycap 121 or 131 is moved upwardly and returned to an original position.

In addition, when the keycap 121 of one of the luminous keys 12 is pressed and the specified function is enabled, a corresponding light-emitting element 14 is driven to emit a light beam in response to the key signal. The light beam will be transmitted to the surroundings through the opening 1231 of the light shade 123 and the light-transmissible part 1211 of the keycap 121. Since the light shade 123 has a function of converging the light beam, the intensity of the light beam emerged from the light-transmissible part 1211 of the keycap 121 is increased to facilitate the user to realize whether the specified function corresponding to the pressed luminous key 12 is enabled.

Since the light shades 123 of the luminous keys 12 are attached on the plastic film layer 16 by adhesion, some drawbacks of the keyboard 12 occur. For example, during the process of attaching the light shade 123 on the plastic film layer 16, if the light shade 123 is suffered from misalignment, the corresponding light-emitting element 14 fails to be completely enclosed by the light shade 123. Under this circumstance, after the keyboard 1 is produced, the intensity of the light beam emerged from the light-transmissible part 1211 of the keycap 121 is usually insufficient. In addition, if the adhesion between the light shade 123 and the plastic film layer 16 is poor, the light shade 123 is easily detached from the keyboard 1. Once the light shade 123 is detached, the light beam emitted by the light-emitting element 14 will be scattered everywhere because the light-emitting element 14 is no longer enclosed by the light shade 123. Under this circumstance, the intensity of the light beam emerged from the light-transmissible part 1211 of the keycap 121 is considerably insufficient.

Moreover, since the light shade 123 is made of a rubbery material, the thickness of the light shade 123 is at least d1 according to the current technology of processing the rubbery material. The distance between the bottom surface of the keycap 121 and the top surface of the light shade 123 is d2. When the keycap 121 of the luminous key 12 is pressed and the keycap 121 is moved downwardly for the distance d2, the bottom surface of the keycap 121 will be contacted with the top surface of the light shade 123. Under this circumstance, the light shade 123 becomes hindrance from continuously pressing the keycap 121. For making electrical conduction of the membrane switch 154, the pressing force acting on the keycap 121 should be increased to move the light shade 123 and the elastic element 122 downwardly. In other words, during the process of pressing the keycap 121, the movement of the keycap 121 is interfered by the light shade 123. Under this circumstance, the finger's tactile feel is unsatisfied.

SUMMARY OF THE INVENTION

The present invention provides a keyboard with enhanced production yield.

The present invention further provides a keyboard with reduced light leakage.

In accordance with an aspect of the present invention, there is provided a keyboard. The keyboard includes a membrane circuit board, a luminous key, a light-emitting element and a plastic film layer. The luminous key is configured for triggering a membrane switch of the membrane circuit board, wherein the luminous key has a keycap with a light-transmissible part. The light-emitting element is disposed on the membrane circuit board and arranged under the light-transmissible part for emitting a light beam. The plastic film layer is disposed on the membrane circuit board, and includes a convex structure, which is integrally formed with the plastic film layer. The light-emitting element is enclosed by the convex structure. The convex structure has an opening aligned with the light-emitting element.

In an embodiment, the plastic film layer is made of Mylar® polyester film.

In an embodiment, the keyboard further includes a reinforcement sheet, which is attached on a bottom surface of the convex structure.

In an embodiment, the reinforcement sheet is made of Mylar® polyester film.

In an embodiment, the membrane circuit board includes an upper circuit board, a partition plate and a lower circuit board. The upper circuit board has a first circuit pattern, wherein the first circuit pattern has at least one upper contact. The partition plate has a perforation corresponding to the upper contact. The lower circuit board has a second circuit pattern. The partition plate is clamped between the upper circuit board and the lower circuit board. The second circuit pattern has a lower contact corresponding to the upper contact and the perforation. The upper contact, the perforation and the lower contact collectively define the membrane switch.

In an embodiment, the luminous key further includes an elastic element, which is arranged between the keycap and the plastic film layer. When the keycap is pressed, the elastic element is compressed to push against the membrane switch. Whereas, when a pressing force exerted on the keycap is eliminated, an elastic force provided by the elastic element is acted on the keycap, so that the keycap is returned to an original position.

In an embodiment, the light source is a light emitting diode.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

Figure 3:
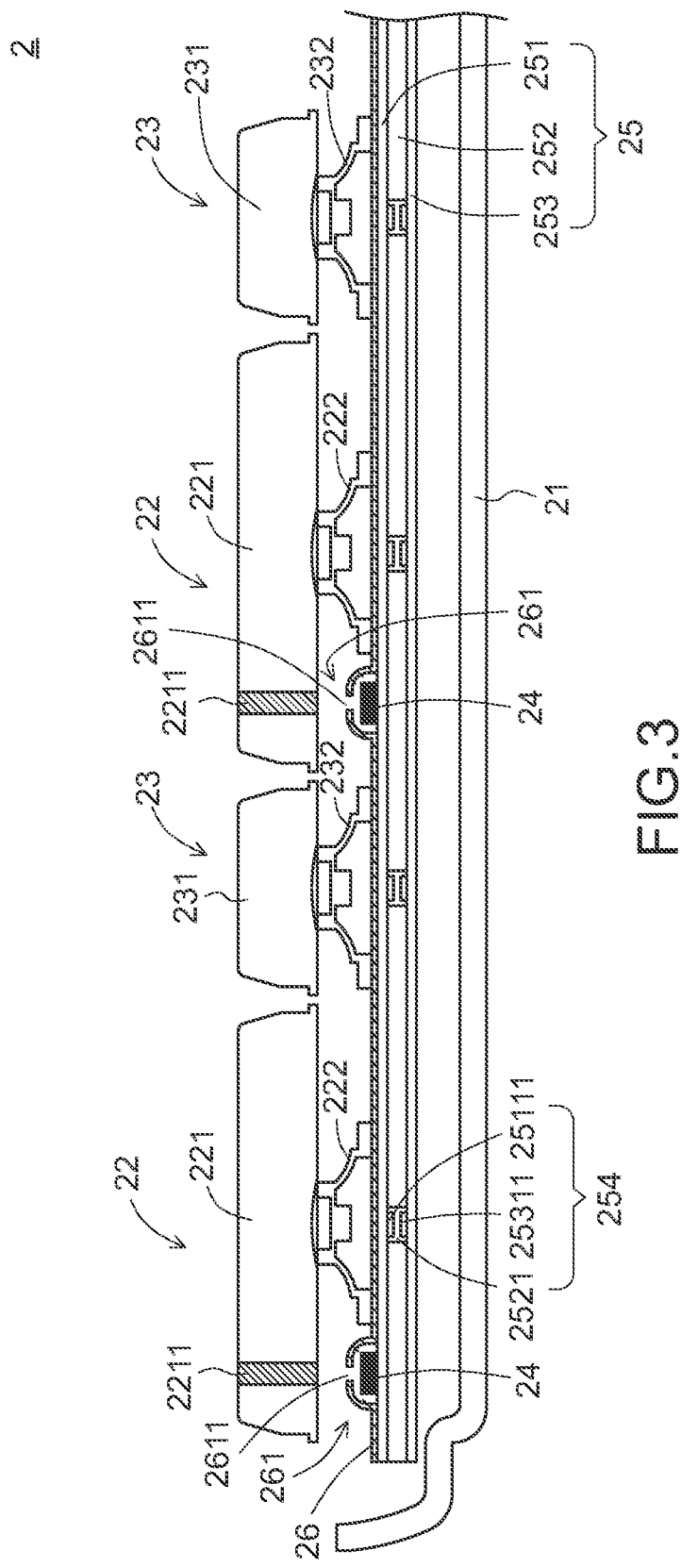
FIG. 3 is a schematic cross-sectional view illustrating a keyboard according to an embodiment of the present invention.
Figure 4:
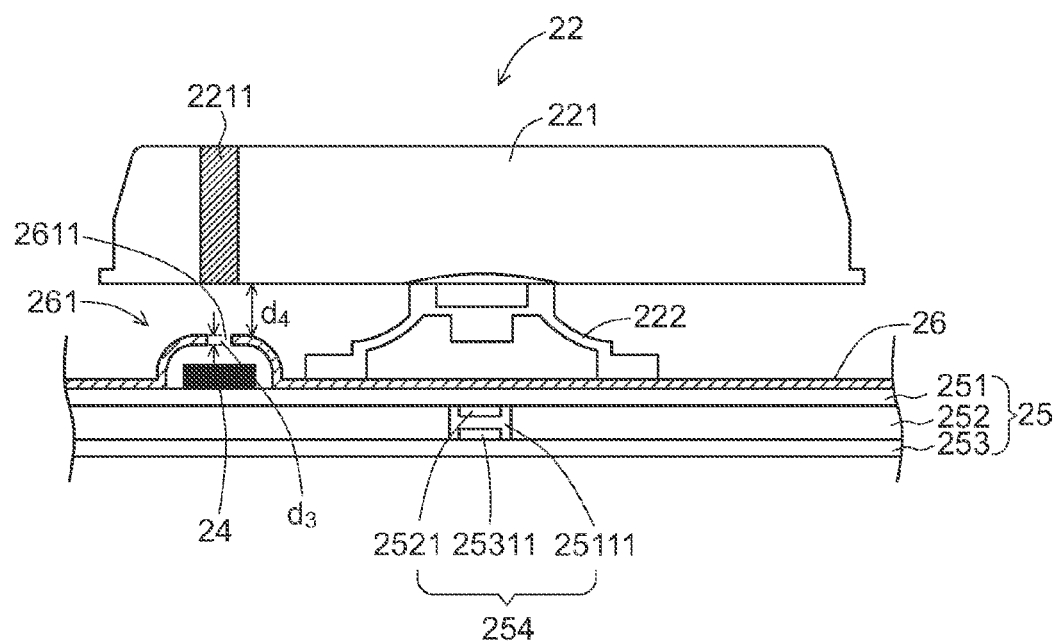
FIG. 4 is a schematic enlarged fragmentary view illustrating the keyboard of FIG. 3.

FIG. 3 is a schematic cross-sectional view illustrating a keyboard according to an embodiment of the present invention. FIG. 4 is a schematic enlarged fragmentary view illustrating the keyboard of FIG. 3. The keyboard 2 comprises a base 21, plural luminous keys 22, plural ordinary keys 23, plural light-emitting elements 24, a membrane circuit board 25 and a plastic film layer 26. The plastic film layer 26 is disposed on the membrane circuit board 25. Each of the luminous keys 22 comprises a keycap 221 and an elastic element 222. Each of the ordinary keys 23 comprises a keycap 231 and an elastic element 232. The elastic elements 231 and 232 are disposed on the plastic film layer 26. The luminous keys 22 are used as specified function keys, which are enabled for enabling corresponding specified functions. The keycap 221 of each luminous key 22 has a light-transmissible part 2211. The light-emitting elements 24 are disposed on the membrane circuit board 25 and arranged under the light-transmissible parts 2211 of corresponding luminous keys 22. An example of the light source 24 is a light emitting diode (LED). Preferably, the plastic film layer 26 is made of Mylar® polyester film or any other comparable material.

Figure 5:
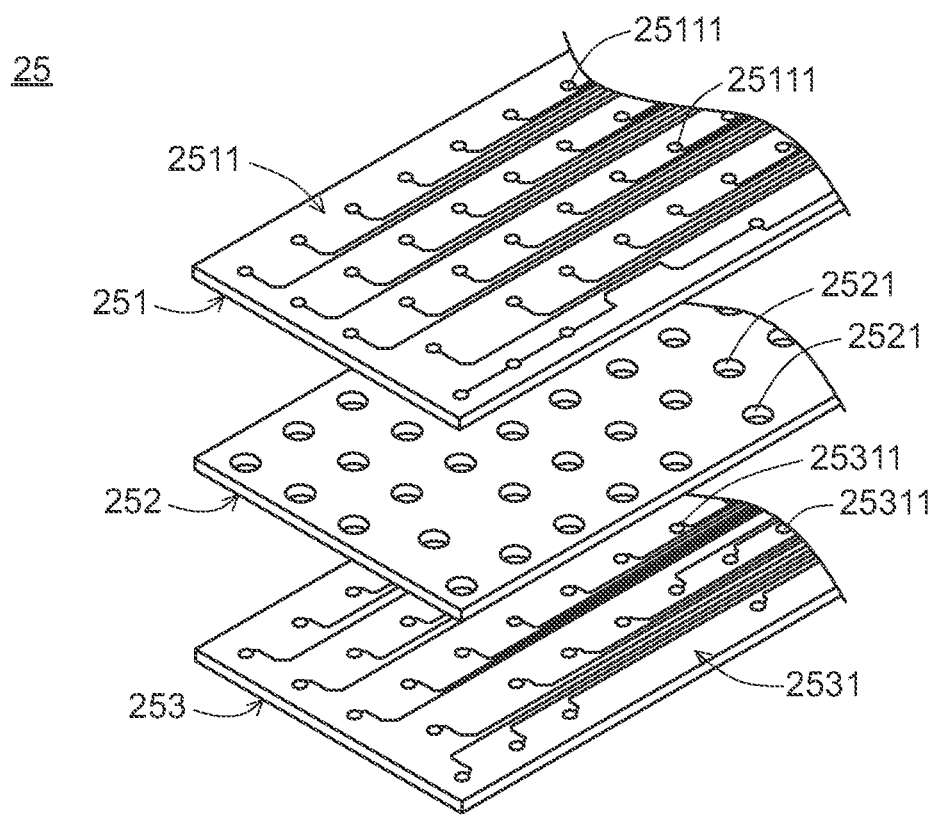
FIG. 5 is a schematic exploded view illustrating the membrane circuit board of FIG. 3.

Please refer to FIG. 5, which is a schematic exploded view illustrating the membrane circuit board of FIG. 3. Moreover, the membrane circuit board 25 comprises an upper circuit board 251, a lower circuit board 253 and a partition plate 252. The partition plate 252 is arranged between the upper circuit board 251 and the lower circuit board 253. The upper circuit board 251 has a first circuit pattern 2511. The first circuit pattern 2511 comprises plural upper contacts 25111 corresponding to the plural keycaps 221 and 231. The lower circuit board 253 has a second circuit board 2531. The second circuit board 2531 comprises plural lower contacts 25311 corresponding to respective upper contacts 25111. The partition plate 252 is clamped between the upper circuit board 251 and the lower circuit board 253. The partition plate 252 comprises plural perforations 2521 corresponding to respective upper contacts 25111 and respective lower contacts 25311. The upper contacts 25111, the lower contacts 25311 and the perforation 2521 that are aligned with each other collectively define a membrane switch 254. When one of the keycap 221 or 231 of the key 22 or 23 is pressed, the keycap 221 or 231 is moved downwardly to compress the elastic element 222 or 232, so that the elastic element 222 or 232 pushes against the corresponding upper contact 2511. Consequently, the upper contact 25111 is contacted with the corresponding lower contact 25311 through the corresponding perforation 2521. When the upper contact 25111 and the lower contact 25311 are contacted with each other, the corresponding membrane switch 254 is electrically conducted, and thus a corresponding key signal is outputted from the keyboard 2. In addition, when the keycap 221 of one of the luminous keys 22 is pressed and the specified function is enabled, a corresponding light-emitting element 24 is driven to emit a light beam in response to the key signal. The light beam will be transmitted to the surroundings through the light-transmissible part 2211 of the keycap 221 to facilitate the user to realize whether the specified function corresponding to the pressed luminous key 22 is enabled.

Hereinafter, the features of the present invention will be illustrated with reference to FIGS. 3 and 4 again. The plastic film layer 26 of the keyboard 2 has the same number of convex structures 261 as the light-emitting elements 24. The light-emitting elements 24 are enclosed by respective convex structures 261. The convex structures 261 have respective openings 2611 aligned with respective light-emitting elements 24. In this embodiment, the convex structures 261 are integrally formed with the plastic film layer 26.

Figure 6:
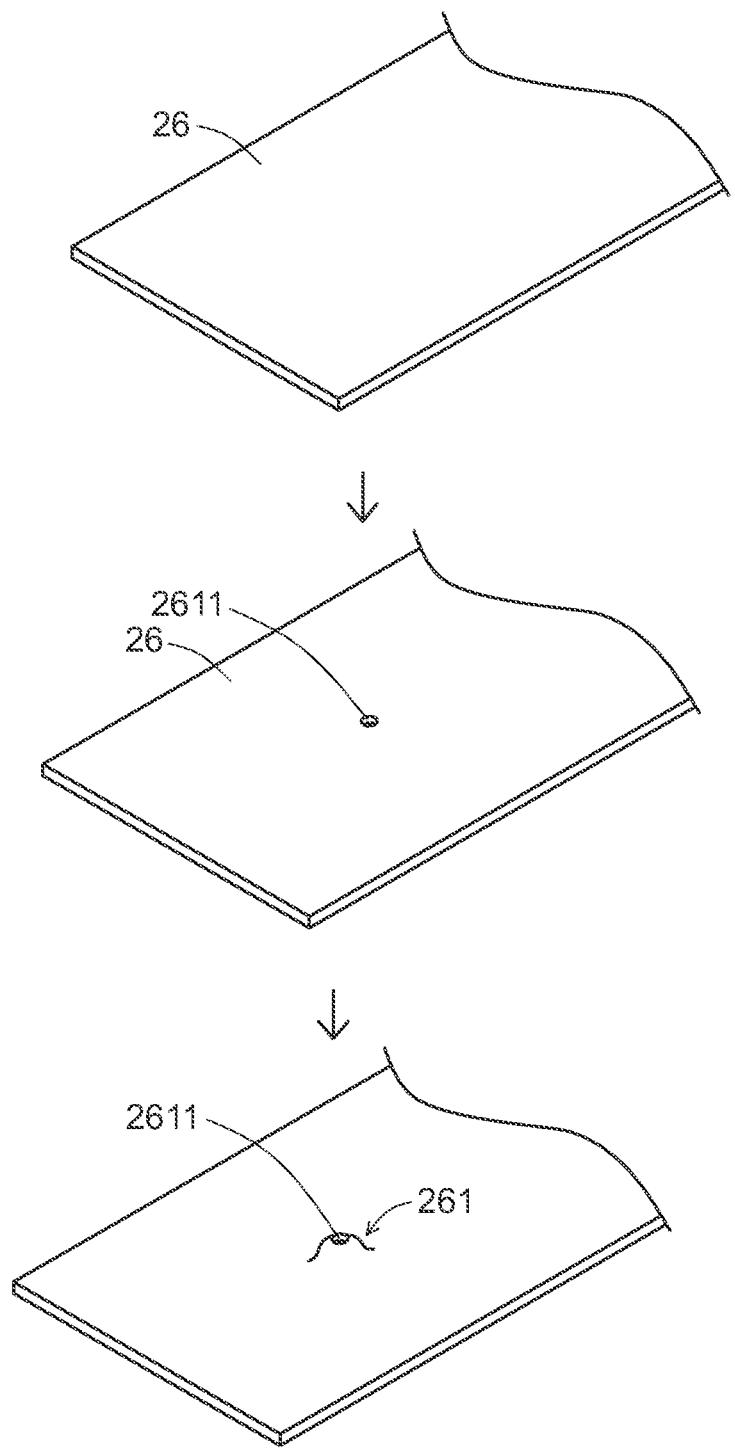
FIG. 6 is a schematic view illustrating a process of forming the convex structures of the plastic film layer of the keyboard as shown in FIG. 3.

FIG. 6 is a schematic view illustrating a process of forming the convex structures of the plastic film layer of the keyboard as shown in FIG. 3. Firstly, a flat plastic film layer 26 is provided. Then, plural opening 261 are formed in the flat plastic film layer 26 by a mold-punching or mold-compressing means. Then, plural convex structures 261 whose centers correspond to the opening 2612 are formed on the plastic film layer 26 by an additional mold-punching or mold-compressing means. In other words, these convex structures 261 are not attached on the plastic film layer 26 by adhesion. For brevity and clarification, only an opening 2611 and a convex structure 261 are shown in FIG. 6. It is noted that, however, those skilled in the art will readily observe that the process of forming the convex structures 261 of the plastic film layer 26 may be modified and altered.

Figure 7:
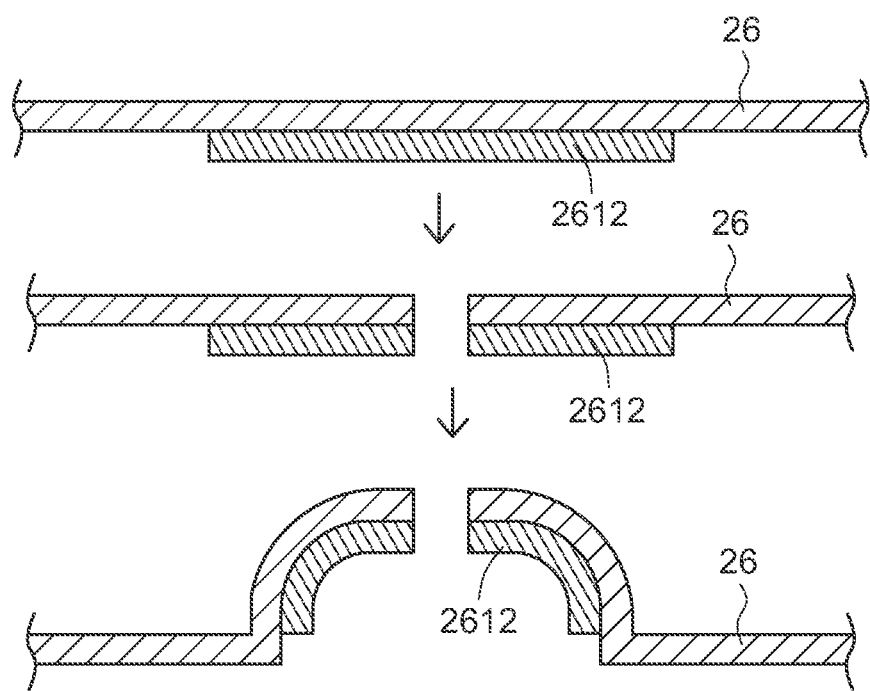
FIG. 7 is a schematic cross-sectional view illustrating another process of forming the convex structures of the plastic film layer of the keyboard according to the present invention.

FIG. 7 is a schematic cross-sectional view illustrating another process of forming the convex structures of the plastic film layer of the keyboard according to the present invention. Firstly, plural reinforcement sheets 2612 having areas larger than the predetermined openings 2611 are formed on the bottom surface of a flat plastic film layer 26 and at the locations corresponding to the predetermined opening 2611. Then, plural openings 261 are collectively defined by the flat plastic film layer 26 and the reinforcement sheets 2612 by a mold-punching or mold-compressing means. Then, plural convex structures 261 whose centers correspond to the opening 261 are collectively defined by the flat plastic film layer 26 and the reinforcement sheets 2612 by an additional mold-punching or mold-compressing means. Since the reinforcement sheets 2612 are attached on the bottom surfaces of the convex structures 261, the uses of the reinforcement sheets 2612 may strengthen the convex structures 261. In an embodiment, the reinforcement sheet 2612 is made of Mylar® polyester film or any other comparable material.

Since the light-emitting elements 24 are enclosed by the convex structures 261 of the flat plastic film layer 26, when a light-emitting element 24 is driven to emit the light beam in response to the key signal, the light beam is only permitted to be transmitted through the opening 2611 of the convex structure 261 without being scattered everywhere. The light beam will be transmitted to the surroundings through the opening 2611 of the convex structure 261 and the light-transmissible part 2211 of the keycap 221, thereby illuminating the keycap 221. Since the convex structure 261 has a function of converging the light beam, the intensity of the light beam emerged from the light-transmissible part 2211 of the keycap 221 is increased to facilitate the user to realize whether the specified function corresponding to the pressed luminous key 22 is enabled.

In addition, since the convex structures 261 are not externally attached on the plastic film layer 26 by adhesion, the drawbacks encountered from the conventional keyboard will be obviated. That is, since the convex structures 261 are integrally formed with the plastic film layer 26, the convex structures 261 will not be suffered from misalignment or detachment. Under this circumstance, the light-emitting elements 24 can be completely enclosed by the convex structures 261, and thus the possibility of causing light leakage will be minimized. In such way, the intensity of the light beam emerged from the light-transmissible part 2211 of the keycap 221 is sufficient all the time.

Figure 1:
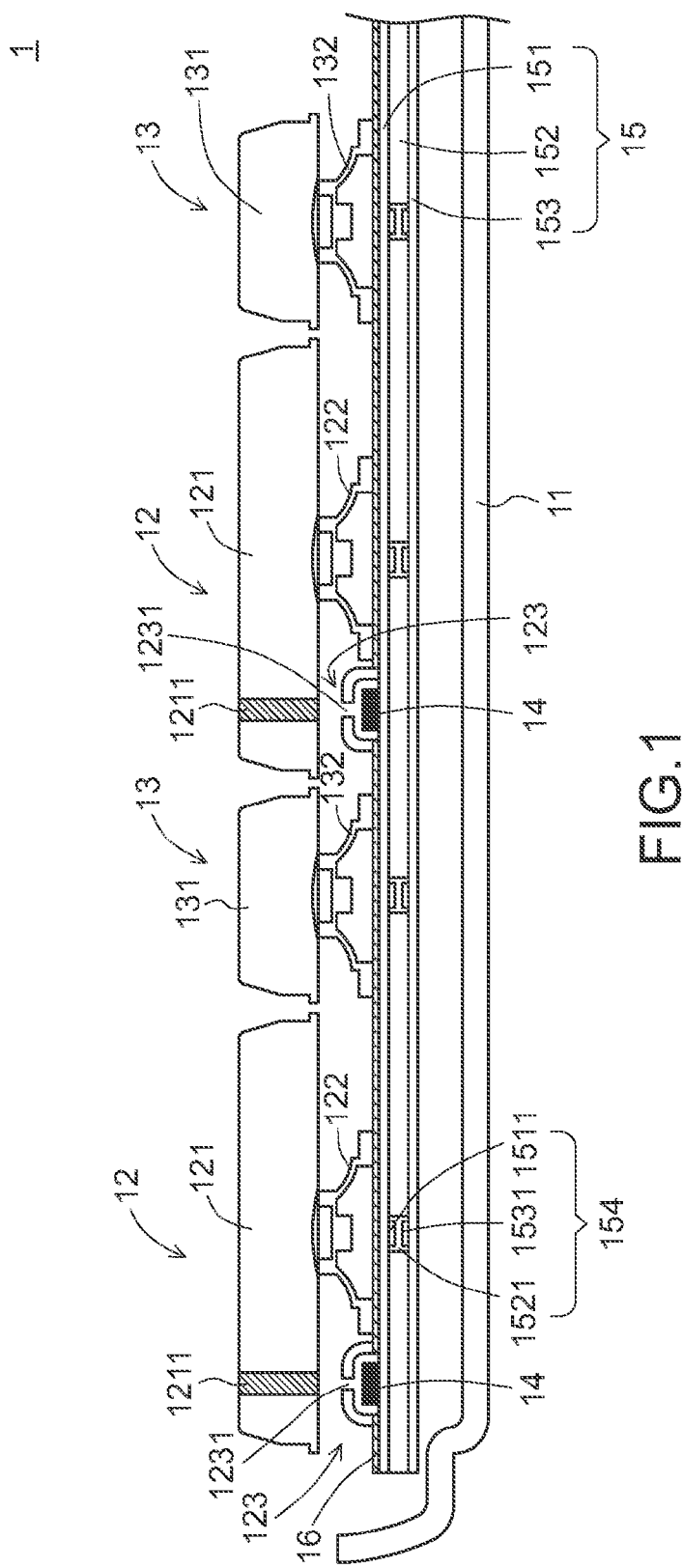
FIG. 1 is a schematic cross-sectional view illustrating a conventional keyboard.
Figure 2:
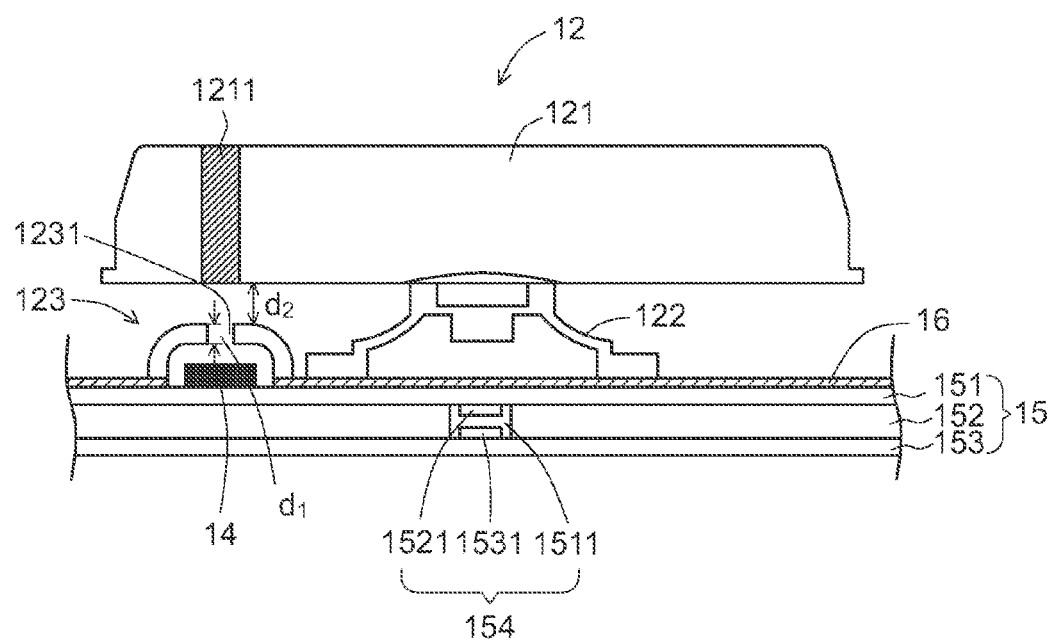
FIG. 2 is a schematic enlarged fragmentary view illustrating the keyboard of FIG. 1.

Please refer to FIGS. 2 and 4 again. Like the convex structures 261, the plastic film layer 26 is made of Mylar® polyester film. Generally, the thickness d3 of the convex structure 261 (Myler) is much smaller than the thickness d1 of the light shade 123 (rubbery material). Under this circumstance, the distance d4 between the bottom surface of the keycap 221 and the top surface of the convex structure 261 is longer than the distance d2 (see FIG. 2). In other words, after the keycap 221 of the luminous key 22 is pressed and the keycap 221 is moved downwardly for the distance d4, the bottom surface of the keycap 221 will be contacted with the top surface of the convex structure 261. In comparison with the conventional keyboard 1, the interference between the convex structure 261 and the keycap 221 of the keyboard 2 of the present invention is largely reduced. Under this circumstance, during the process of pressing the keycap 221, the finger's tactile feel is enhanced.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A keyboard, comprising:
    a membrane circuit board;
    a luminous key for triggering a membrane switch of said membrane circuit board, wherein said luminous key has a keycap with a light-transmissible part;
    a light-emitting element disposed on said membrane circuit board and arranged under said light-transmissible part for emitting a light beam;
    a plastic film layer disposed on the membrane circuit board, and comprising a convex structure, which is integrally formed with said plastic film layer, wherein said light-emitting element is enclosed by said convex structure, and said convex structure has an opening aligned with said light-emitting element; and
    a reinforcement sheet, which is attached on a bottom surface of said convex structure, wherein said reinforcement sheet comprises an opening corresponding to said opening of the plastic film layer.

2. The keyboard according to claim 1 wherein said plastic film layer is made of polyester film.

3. The keyboard according to claim 1 wherein said reinforcement sheet is made of polyester film.

4. The keyboard according to claim 1 wherein said membrane circuit board comprises:
    an upper circuit board having a first circuit pattern, wherein said first circuit pattern has at least one upper contact;
    a partition plate having a perforation corresponding to said upper contact; and
    a lower circuit board having a second circuit pattern, wherein said partition plate is clamped between said upper circuit board and said lower circuit board, and said second circuit pattern has a lower contact corresponding to said upper contact and said perforation,
    wherein said upper contact, said perforation and said lower contact collectively define said membrane switch.

5. The keyboard according to claim 4 wherein said luminous key further comprises an elastic element, which is arranged between said keycap and said plastic film layer, wherein when said keycap is pressed, said elastic element is compressed to push against said membrane switch, wherein when a pressing force exerted on said keycap is eliminated, an elastic force provided by said elastic element is acted on said keycap, so that said keycap is returned to an original position.

6. The keyboard according to claim 1 wherein said light source is a light emitting diode.

\* \* \* \* \*